(12) United States Patent
Oh et al.

(10) Patent No.: US 9,630,543 B2
(45) Date of Patent: Apr. 25, 2017

(54) CUP HOLDER FOR VEHICLE

(71) Applicant: Hyundai Motor Company, Seoul (KR)

(72) Inventors: Man Ju Oh, Yongin-si (KR); Jae Woong Kim, Hwaseong-si (KR); Jae Woo Park, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 242 days.

(21) Appl. No.: 14/459,209

(22) Filed: Aug. 13, 2014

(65) Prior Publication Data

US 2015/0165955 A1    Jun. 18, 2015

(30) Foreign Application Priority Data

Dec. 18, 2013  (KR) .................. 10-2013-0157911

(51) Int. Cl.
| | |
|---|---|
| *F25B 21/02* | (2006.01) |
| *F24F 13/22* | (2006.01) |
| *B60N 3/10* | (2006.01) |
| *F25B 21/04* | (2006.01) |
| *F25D 21/14* | (2006.01) |

(52) U.S. Cl.
CPC .............. *B60N 3/104* (2013.01); *F25B 21/02* (2013.01); *F25B 21/04* (2013.01); *F25D 21/14* (2013.01); *F25B 2321/023* (2013.01); *F25B 2321/025* (2013.01)

(58) Field of Classification Search
CPC ........ B60N 3/104; F24F 13/22; F24F 13/222; F24F 13/224; F24F 13/225; F24F 13/227; F25B 21/02; F25B 2321/02; F25B 2321/025
See application file for complete search history.

(56) References Cited

U.S. PATENT DOCUMENTS

| | | | |
|---|---|---|---|
| 5,720,171 A | 2/1998 | Osterhoff et al. | |
| 6,401,461 B1* | 6/2002 | Harrison | ................ F25B 21/02 62/3.61 |
| 8,104,295 B2 | 1/2012 | Lofy | |
| 2012/0125027 A1* | 5/2012 | Echols | .................... F25B 39/04 62/150 |

FOREIGN PATENT DOCUMENTS

| | | |
|---|---|---|
| JP | 2001-508722 A | 7/2001 |
| KR | 10-0340196 B1 | 6/2002 |
| KR | 10-2006-0114593 A | 11/2006 |
| KR | 10-2013-0083357 A | 7/2013 |

* cited by examiner

*Primary Examiner* — Ryan J Walters
*Assistant Examiner* — Erik Mendoza-Wilkenfe
(74) *Attorney, Agent, or Firm* — Morgan, Lewis & Bockius LLP

(57) ABSTRACT

A cup holder for a vehicle may include a holder body having a thermoelectric element to perform cooling and/or heating of a cup stored in the holder body and having a blower to circulate air in the holder body to enhance heat convention, a heat exchanging part provided on a heat radiating surface of the thermoelectric element to perform heat exchange, and a moisture absorption part having one end portion disposed at a lower portion of the blower of the holder body to absorb moisture and the other end portion disposed at a side of the heat exchanging part to vaporize the moisture.

7 Claims, 3 Drawing Sheets

CUP HOLDER FOR VEHICLE

CROSS REFERENCE TO RELATED APPLICATION

The present application claims priority of Korean Patent Application Number 10-2013-0157911 filed on Dec. 18, 2013, the entire contents of which application are incorporated herein for all purposes by this reference.

BACKGROUND OF INVENTION

Field of Invention

The present invention relates to a cup holder for a vehicle having a structure capable of safely discharging condensate water generated at the time of cooling the cup holder in a cooling and heating cup holder using a thermoelectric element.

Description of Related Art

A cup holder has been provided for a vehicle, and the like. This cup holder generally possesses a simple pick-up function, but a cup holder with cooling and heating functions in addition to the pick-up function has been suggested according to some car models.

Meanwhile, this cup holder may be installed at an armrest or provided to a tray of a front seat in order to increase marketability of a back seat. However, since the tray or the armrest is provided with various switches and storage spaces, a design having a structure capable of effectively cooling a thermoelectric element has been required.

In addition, in order to improve typical convenience, when the cup holder is mounted on the armrest, a controller controlling heating and cooling of the cup holder, a controller for an audio and other equipment for convenience, or the storage space for storage is present at a back surface of the cup holder. Therefore, an internal structure of the armrest becomes very narrow and complex and each component needs to be arranged to secure performance.

Thus, there is a need for a cup holder for a vehicle having a structure capable of safely discharging condensate water generated at the time of cooling the cup holder in a cooling and heating cup holder using the thermoelectric element.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention is directed to a cup holder for a vehicle having a structure capable of safely discharging condensate water generated at the time of cooling the cup holder in a cooling and heating cup holder using a thermoelectric element.

According to various aspects of the present invention, there is provided a cup holder for a vehicle, the cup holder including: a holder body having a thermoelectric element to perform cooling and/or heating of a cup stored therein and having a blower to circulate air therein to enhance heat convention, a heat exchanging part provided on a heat radiating surface of the thermoelectric element to perform heat exchange, and a moisture absorption part having one end portion disposed at a lower portion of the blower of the holder body to absorb moisture and the other end portion disposed at a side of the heat exchanging part to vaporize the moisture.

The holder body may be made of a metal material capable of conducting heat. The thermoelectric element may have an air conditioning surface contacting the holder body and the heat radiating surface contacting the heat exchanging part. One side surface of the heat exchanging part may contact the thermoelectric element and the other side surface of the heat exchanging part may contact the other end portion of the moisture absorption part. The moisture absorption part may include a moisture absorption paper made of a paper material.

The blower may be provided to a side portion of the holder body and may be provided between an upper hole of the holder body and a lower hole of the holder body. The blower may be provided in a housing connecting the upper hole and the lower hole of the holder body, the housing may have a drain hole formed at a lower end thereof, and the one end portion of the moisture absorption part may be provided at a lower portion of the drain hole.

The moisture absorption part may have the one end portion provided at the lower portion of the blower, extend to pass through and beneath the lower portion of the holder body, and have the other end portion contacting the heat exchanging part.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
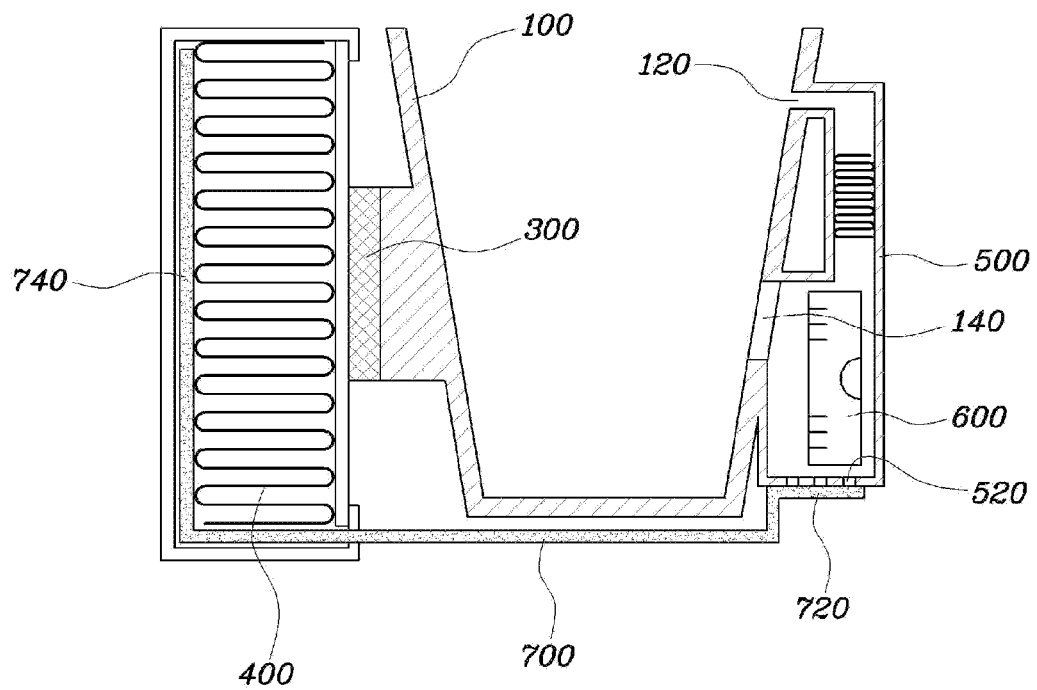
FIG. 1 is a cross-sectional structure view of an exemplary cup holder for a vehicle according to the present invention.
Figure 2:
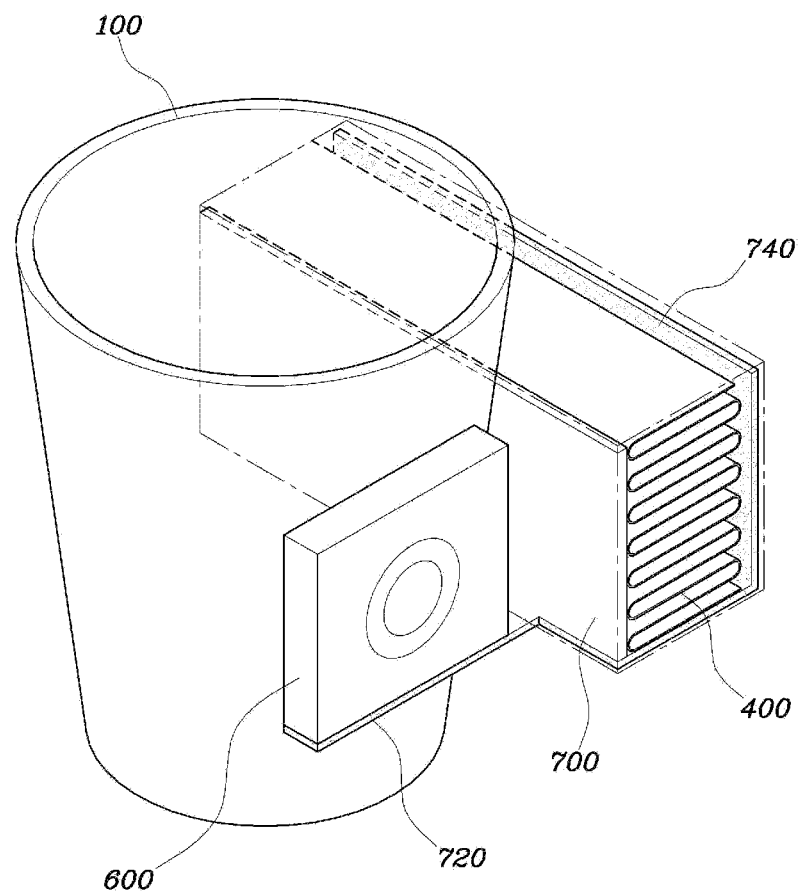
FIG. 2 is a perspective view of an exemplary cup holder for a vehicle according to the present invention.
Figure 3:
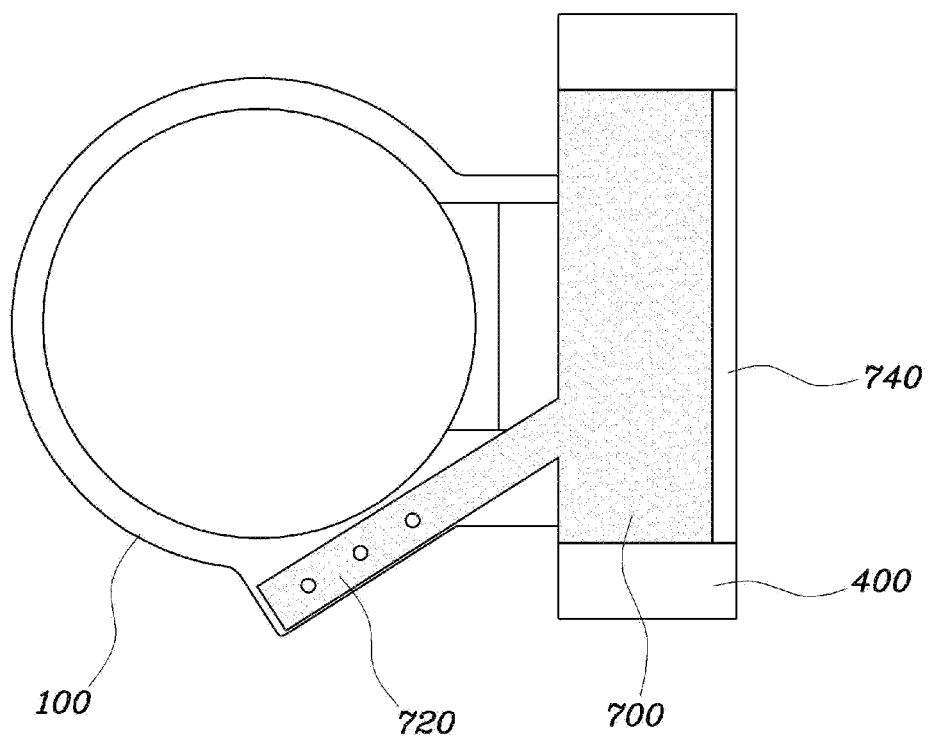
FIG. 3 is a top view of an exemplary cup holder for a vehicle according to the present invention.

FIG. 1 is a cross-sectional structure view of a cup holder for a vehicle, FIG. 2 is a perspective view of the cup holder for the vehicle, and FIG. 3 is a top view of the cup holder for the vehicle according to various embodiments of the present invention.

A cup holder for a vehicle according to various embodiments of the present invention may include a holder body 100 having a thermoelectric element 300 to thereby perform cooling and/or heating of a cup stored therein and having a blower 600 performing convection of air therein, a heat exchanging part 400 provided on a heat radiating surface of the thermoelectric element 300 to thereby perform heat exchange, and a moisture absorption part 700 having one end or one end portion 720 disposed at a lower portion of the blower 600 of the holder body 100 to thereby absorb moisture and the other end or the other end portion 740 disposed at the heat exchanging part 400 side to thereby vaporize moisture.

The cup holder according to various embodiments of the present invention is to implement cooling and/or heating of a cup stored therein using the thermoelectric element 300 and a configuration thereof is as follows.

First, the holder body 100 has the thermoelectric element 300 to thereby perform cooling and heating of the cup stored therein and has the blower 600 performing convection of air therein. The holder body 100 may be made of a metal material capable of conducting heat. Therefore, the holder body 100 may directly conduct heat to the cup stored therein and may simultaneously perform a convection heat transfer by the blower 600.

In addition, the thermoelectric element 300 may have an air conditioning surface contacting the holder body and a heat radiating surface contacting the heat exchanging part 400. The thermoelectric element performs desired heat radiation or heat absorption on the air conditioning surface using an internal semiconductor according to an electrical operation and performs an opposite or reverse operation on the heat radiating surface. However, in the case in which the thermoelectric element has an intention of the cooling, efficiency of a structure discharging heat immediately ensures efficiency of the air conditioning. Therefore, to this end, the heat exchanging part 400 provided on the heat radiating surface of the thermoelectric element 300 to thereby perform the heat exchange is provided.

The heat exchanging part 400 is a heat exchanging fin stored in a housing as shown and it is also possible to effectively perform the heat radiation by providing a separate external blower to the heat exchanging part 400.

Meanwhile, the moisture absorption part 700 has one end 720 disposed at a lower portion of the blower 600 of the holder body 100 to thereby absorb moisture and the other end 740 disposed at the heat exchanging part 400 side to thereby vaporize moisture. That is, when the thermoelectric element 300 performs a cooling operation, the holder body 100 becomes very cold. As a result, ambient air is condensed, such that condensate water is generated. The condensate water as mentioned above is collected in the holder body 100, such that damage to the blower 600, the thermoelectric element 300, or other electronic components may be caused. Therefore, the moisture absorption part 700 absorbs and transfers the condensate water dropped from the lower portion of the blower 600 and the heat exchanging part 400 dries and vaporizes the condensate water, such that moisture may be completely removed.

Specifically, one side surface of the heat exchanging part 400 may contact the thermoelectric element 300 and the other side surface thereof may contact the other end 740 of the moisture absorption part 700. Therefore, an affect of moisture for the thermoelectric element 300 may be minimized.

In addition, the moisture absorption part 700 may be a moisture absorption paper made of a paper material.

Meanwhile, the blower 600 may be provided to a side portion of the holder body 100 and may be provided between an upper hole 120 of the holder body 100 and a lower hole 140 of the holder body 100. Specifically, the blower 600 may be provided in a housing 500 connecting the upper hole 120 and the lower hole 140 to each other, the housing 500 may have a drain hole 520 formed at a lower end thereof, and one end 720 of the moisture absorption part 700 may be provided at a lower portion of the drain hole 520.

The moisture absorption part 700 may have one end 720 provided at the lower portion of the blower 600 and extended so as to pass through the lower portion of the holder body 100 and the other end 740 contacting the heat exchanging part 400. Since the water is collected at the lower portion, the water is easily gathered at the lower portion and may be easily collected by the moisture absorption part 700.

Therefore, the moisture absorption part 700 absorbs moisture discharged through the drain hole 520 of the lower end of the housing 500 and transfers the absorbed moisture, such that the absorbed moisture is discharged by drying and vaporizing. Particularly, in the case in which the heat exchanging part 400 is provided with an external blower, moisture may be discharged to the outside of the cup holder.

According to various embodiments of the present invention, the cup holder for the vehicle may have the structure capable of safely discharging the condensate water generated at the time of cooling the cup holder in the cooling and heating cup holder using the thermoelectric element.

For convenience in explanation and accurate definition in the appended claims, the terms "upper" or "lower", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cup holder for a vehicle, the cup holder comprising:
   a holder body having a thermoelectric element to perform cooling and/or heating of a cup stored therein and having a blower to circulate air therein to enhance heat convention;
   a heat exchanging part provided on a heat radiating surface of the thermoelectric element to perform heat exchange; and
   a moisture absorption part having a first end portion disposed at a lower portion of the blower of the holder body to absorb moisture and a second end portion disposed at a side of the heat exchanging part to vaporize the moisture,
   wherein the moisture absorption part has the first end portion provided at the lower portion of the blower, extends to pass under the holder body, and has the second end portion contacting the heat exchanging part.

2. The cup holder of claim 1, wherein the holder body is made of a metal material capable of conducting heat.

3. The cup holder of claim 1, wherein the thermoelectric element has an air conditioning surface contacting the holder body and the heat radiating surface contacting the heat exchanging part.

4. The cup holder of claim 1, wherein a first side surface of the heat exchanging part contacts the thermoelectric element and a second side surface of the heat exchanging part contacts the second end portion of the moisture absorption part.

5. The cup holder of claim 1, wherein the moisture absorption part includes a moisture absorption paper made of a paper material.

6. The cup holder of claim 1, wherein the blower is provided to a side portion of the holder body and is provided between an upper hole of the holder body and a lower hole of the holder body.

7. The cup holder of claim 6, wherein the blower is provided in a housing connecting the upper hole and the lower hole of the holder body, the housing has a drain hole formed at a lower end thereof, and the first end portion of the moisture absorption part is provided at a lower portion of the drain hole.

* * * * *